March 1, 1949.  H. E. McCALLION  2,463,292
MACHINE ELEMENT
Filed Feb. 6, 1946  2 Sheets-Sheet 1
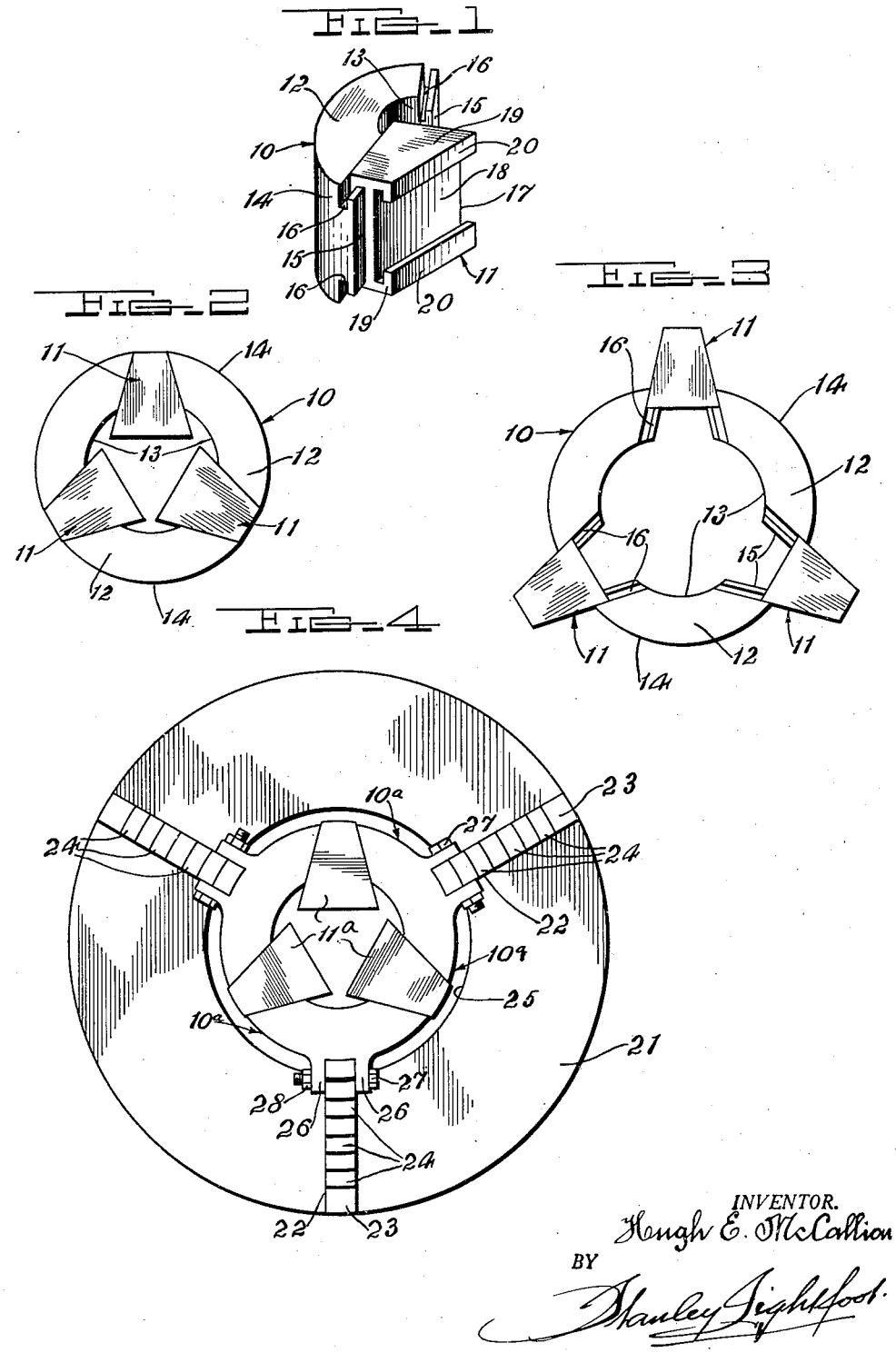
INVENTOR.
Hugh E. McCallion
BY
Stanley Lightfoot

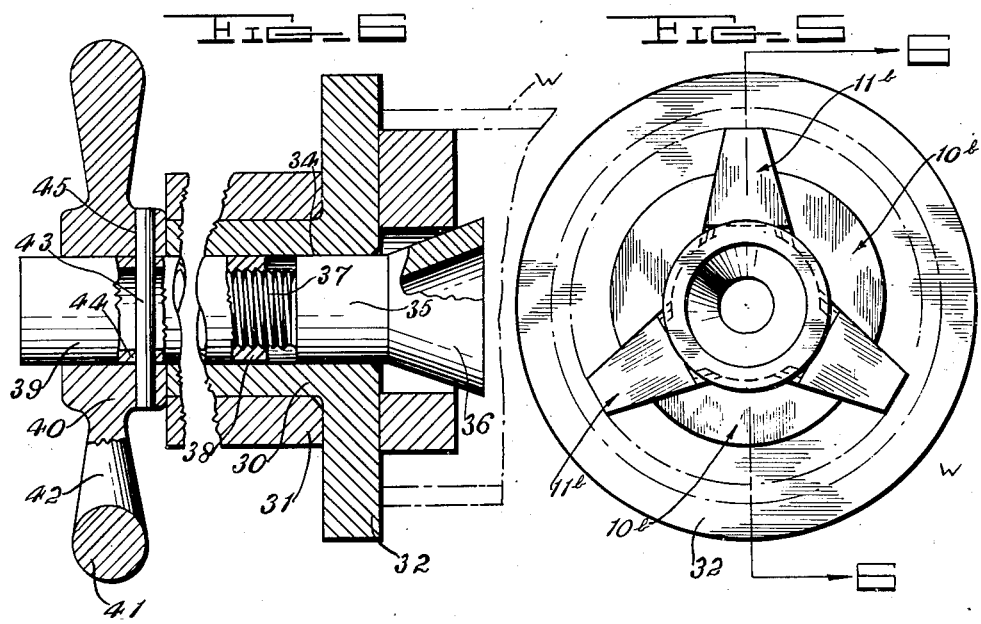
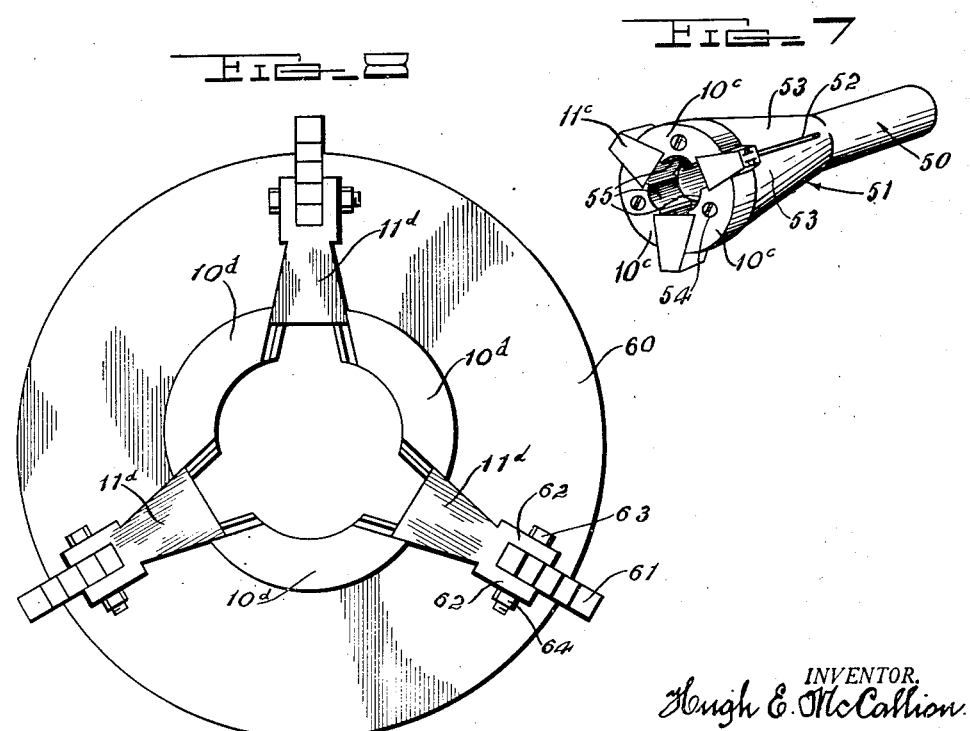

Patented Mar. 1, 1949

2,463,292

UNITED STATES PATENT OFFICE 2,463,292

MACHINE ELEMENT

Hugh E. McCallion, Roseville, Mich.

Application February 6, 1946, Serial No. 645,894

6 Claims. (Cl. 279—55)

The present invention relates to machine elements for use in a wide range of machine tools and the like, and more particularly to an articulated annulus for use in connection with various machine tools such as work gripping chucks, collets and other work holding devices.

The primary object of the invention resides in the provision of an articulated sectional annulus in which the meeting surfaces of the segmental members and wedge shaped members thereof are disposed at an angle tangent to the axis of the annulus, whereby radial movement of the segmental members will produce an accelerated or accentuated movement of the wedge shaped members in both radial directions of movement, and conversely, radial movement of the wedge shaped members will produce a slow or delayed radial movement of the segmental members upon radial movement of the wedge shaped members in both radial directions of movement.

Another object of the invention is to provide an articulated annulus which is composed of a series of circumferentially arranged members having mutually engaging interlocking sliding surfaces disposed at an angle tangent to the axis of the annulus so that said members will be held in relative sliding relation one to the other.

Another object of the invention is to provide an articulated annulus which is capable of use as a chuck or gripping device for a machine tool or the like, where large or great gripping forces are required to hold a piece of work in position while being operated upon.

Another object of the invention is to provide an articulated annulus of the above mentioned character in which one set of the articulated members forming the annulus are adapted to be employed as radially movable gripping or chucking jaws, while the other set of articulated members form a carrier therefor, so that movement of the carrier members will simultaneously cause radial sliding movement of the gripping and chucking jaw members by an increased or decreased amount, depending upon which set of articulated members are employed as gripping and chucking jaws.

Another object of the invention is to provide a sectional annulus composed of a series of alternately and circumferentially arranged articulated segmental and wedge shaped members which are designed and constructed for gripping work either internally or externally.

Another object of the invention is to provide a device of the above mentioned character in which means is provided for causing radial movement of one set of said series of articulated members at a predetermined rate of speed, and to cause radial movement of the other set of members at different rate of speed when the invention is employed as a chucking or gripping device.

Another object of the invention is to provide a sectional articulated annulus composed of a series of alternately and circumferentially arranged segmental and wedge shaped members in which a slight movement of the controlling means for the segmental members will produce an amplified movement of the wedge shaped members, thereby necessitating less adjustment on the part of the operator of the chucking and gripping device to produce a quick adjustment of the wedge shaped chucking or gripping jaws.

Another object of the invention is to provide a sectional articulated annulus which may be employed as an adjustable pipe threading die head, with the segmental members forming the die members, and the wedge shaped members producing, when moved in both radial directions a minute and accurate adjustment of the die members. Thus, the segmental members as screw cutting dies may be accurately adjusted within extremely close precision limits.

Another object of the invention is to provide a device of the above mentioned character which may be applied to the work gripping collet of a screw machine or the like, with the segmental members yieldingly supported on the end of the chuck shaft and the wedge-shaped members providing control means for opening and closing the segmental members in timed relation to the feed movement of the collet.

Other objects and advantages of the invention will become apparent during the course of the following description of the accompanying drawings wherein:

Figure 1 is a perspective view of one embodiment of the invention, showing the manner in which the arcuate segmental and wedge-shaped members are slidably connected for relative movement to form a sectional articulated annulus;

Figure 2 is a side elevational view of the invention, showing a series of articulated segmental and wedge-shaped members forming a sectional annulus with the wedge-shaped and segmental members in a contracted position;

Figure 3 is a side elevational view of the invention, similar to Figure 2, but showing the articulated segmental and wedge-shaped members in their expanded or projected positions;

Figure 4 is a side elevational view of a modified form of the invention showing one adaptation thereof, and illustrating the same attached to the work gripping jaws of a conventional chuck;

Figure 5 is a front elevational view of a further modified form of the invention in which the segmental and wedge-shaped members are arranged for internally engaging a work piece with the wedge-shaped members constituting work engaging jaws for said chucking device;

Figure 6 is a diametrical cross sectional view taken on line 6—6 of Figure 5 and looking in the direction of the arrows, to illustrate various details of construction incident to the mechanism for expanding the arcuate segmental members into engagement with the work;

Figure 7 is a perspective view of a still further modified form of the invention in which the inventive concept is applied to a work gripping and feeding collet; and Figure 8 is a front elevational view of a still further modified form of the invention in which the wedge-shaped members are affixed to the work gripping jaws of a conventional chuck so that radial movement thereof will effect a retarded radial movement of the arcuate segmental members. The particular adaptation being in the form of a work holding chuck in which the arcuate segmental members form the work gripping jaws thereof.

In the drawings, wherein there is shown and illustrated several adaptations of the principle of the invention, attention is first directed to Figures 1 to 3 inclusive, wherein the component parts of the sectional articulated annulus are illustrated. Broadly, the invention consists of a series of circumferentially spaced, arcuate segmental members 10 interconnected for sliding movement in both radial directions by a series of intermediate wedge-shaped sector members 11, there being shown for the purpose of illustration, three of each arranged to form an articulated annulus, but it is pointed out that any number of segmental and wedge-shaped members may be employed, depending upon the size of the machine element for which the device is intended.

The arcuate segmental members 10 are of identical construction and hence, a description of one will suffice for all, and as shown best in Figure 1, said members are each formed of straight radial side walls 12 connected by arcuately curved inner and outer peripheral walls 13 and 14 respectively. Also, as illustrated in Figure 1, the end walls 15 of the arcuate segmental-shaped members 10 are formed at an angle to extend in a plane oblique to the true radius of the sectional articulated annulus, and in a direction tangent thereto.

Formed in the radial side walls of the arcuate segmental member 10 adjacent the tangential end walls 15 thereof, is an inwardly extending groove 16. The groove 16 at each end of the arcuate segmental member being in opposed relation and forming guides or ways for facilitating sliding connection thereof with the wedge-shaped or sector members 11.

The wedge-shaped members 11 are each formed of a body portion 17 having triangularly disposed wall surfaces 18 and sector shaped flanges 19 at each side thereof to extend a slight distance beyond the angular wall surfaces 18 of the body portion. It is to be noted that the radial wall surfaces of the overhanging flanges 19 are disposed in the same plane as the radial side walls of the arcuate segmental members 10, and that the triangularly related end wall surfaces 18 are disposed in the same oblique plane as the tangential end walls 15 of the arcuate segmental members 10.

Each of the flanged portions 19 of the wedge-shaped members 11 are provided adjacent their edges with opposed ribs 20 which are adapted to be slidably received in the grooves or guideways 16 adjacent each end of the arcuate segmental members 10, thus providing a sliding connection between said segmental and wedge-shaped members, so that movement of one set thereof will effect movement of the other set in both directions of radial movement.

The arrangement thus illustrated in Figures 1 to 3 inclusive provides a sectional articulated annulus with the arcuate segmental and wedge-shaped members slidably connected for relative movement. One set of members being disposed to travel at a different rate of speed radially with respect to the other set of sectional members. This difference in speed of movement may, in the case of a chuck or work holding device, cause a fast or accentuated movement of the chucking jaws (wedge-shaped members), while another adaptation of the invention may employ the segmental members as work holding or gripping devices actuated by the wedge-shaped members to produce a slow or retarded movement of the work gripping and engaging jaws (segmental members).

Attention is directed to Figure 4, wherein the invention shown and described in Figures 1 to 3 inclusive is illustrated as applied to a work holding or gripping chuck. There is shown a conventional scroll chuck 21 having radially extending grooves 22 for accommodating the usual work engaging chuck jaws 23 which are provided with a series of stepped portions on various radii for engaging work. Mounted within the central opening 25 of the scroll chuck 21 is a series of circumferentially spaced arcuate segmental members 10a interconnected by alternately arranged wedge-shaped sector members 11a. The arcuate segmental members 10a and wedge-shaped sector members 11a are constructed in identically the same manner to those shown in Figures 1 to 3 inclusive, and are arranged so that radial sliding movement of the segmental members 10a in both directions will impart radial sliding movement to the wedge-shaped members 11a at an accelerated or increased speed. In order to move said arcuate segmental members 10a in both radial directions of movement, the inner ends of the radially movable chuck jaws 23 are anchored between a pair of radially extending lugs or ears 26 formed on the outer peripheral wall of each arcuate segmental member 10a and are held in place by means of connecting bolts 27, having suitable retaining nuts 28 threaded on the free ends thereof. The retaining bolts are passed through aligned openings in the inner ends of the conventional chuck jaws 23, and the radially projecting ears or lugs 26 on the arcuate segmental members 10a.

It will be readily seen that radial to and fro movement of the conventional chuck jaws 23 will cause the arcuate segmental members 10a to be moved radially by a corresponding amount, and that such movement will be transmitted to the wedge-shaped members to cause the same to move at a slightly greater rate of speed than the arcuate segmental members 10a. Hence, the operator of the lathe or machine tool may quickly adjust the wedge-shaped members 11a to a position of work engaging relationship for gripping a piece of work between the inner faces of the wedge-shaped members 11a. If desired, stepped work engaging faces may be provided on the outer walls of the wedge-shaped members 11a in a manner similar to the conventional work gripping jaws 23 of the scroll chuck 21.

In the further modified form of the invention shown in Figures 5 and 6, the same is shown as being adapted to an internal gripping or chucking device for a lathe or other machine tool, and, for the purpose of illustration, the reference character 30 may represent the tubular shaft of said machine tool which is mounted for rotation in a bearing 31 formed as a part of the machine tool frame (not shown). Formed integral with the rotary tubular shaft 30 at one end thereof, is a radially extending flange plate 32 against which a series of circumferentially-spaced arcuate segmental members 10b may be positioned for sliding movement relative thereto. Also positioned against the radial wall of the flange plate 32 and slidably interposed between the arcuate segmental members 10b is a series of wedge-shaped sector members 11b. The arcuate segmental members and wedge-shaped members 10b and 11b respectively are constructed the same as those shown and described in Figures 1 to 3 inclusive, and are likewise interconnected for relative radial sliding movement by means of tongue and groove connections (Figs. 1 to 3 inclusive) or any other form of mutually engaging slidable connecting means.

Mounted for axial sliding movement within the bore 34 of the tubular shaft 30 is a short tubular shaft 35 which is flared outwardly to form a cone frustrum 36, the outer conical surface of which is adapted to engage the inner peripheral wall surface of the arcuate segmental members 10b. The other end of the short tubular shaft 35 is screw threaded as at 37 for the remainder of its length for being engaged by internal screw threads 38 formed in one end of a tubular shaft 39 which is likewise slidably mounted in the tubular shaft 30, and is provided with a bore of sufficient diameter to telescope over the screw threaded end of the short tubular shaft 35. The tubular shaft 39 is rotatable relative to the short tubular shaft 35 and has affixed to the outer end thereof the enlarged hub 40 of a manual control element or wheel 41 which is connected with the hub 40 by means of integrated radially extending spokes 42. A transverse locking pin 43 is passed through diametrically disposed and aligned openings 44 and 45 in the tubular sleeve 39 and hub 40 respectively for rigidly connecting the manual control handle 41 to said sleeve.

When it is desired to grip a piece of work W (Figure 6), the outer faces of the wedge-shaped members 11b are moved radially outward into engagement with the internal diameter of said work by manipulating the manual hand control wheel or element 41. Upon rotation of the manual control wheel 41, the sleeve 39 is telescopically threaded on the threaded projection 37 of the tubular short shaft 35, and by reason of the fact that the hub 40 of said manual control wheel is in abutting relation with the tubular shaft 30, the frustro-conical portion 36 of said short tubular shaft 35 is retracted and causes expansion of the segmental members 10b, thus forcing the work engaging jaws 11b into gripping engagement with the work W by transmitting motion at an accelerated speed from said arcuate segmental members to said wedge-shaped members, only a slight angular movement of the hand wheel will produce an increased radial movement of the wedge-shaped work engaging jaws 11b.

In the further modified form of the invention shown in Figure 7, the invention is illustrated as being applied to the feed collet of a screw machine having a tubular shaft 50 provided at one end with a frustro-conical portion 51. The frustro-conical portion 51 is provided with radially extending circumferentially-spaced slots 52 to provide yielding spring arms 53. Affixed to the end walls of the yielding spring arms are arcuate segmental members 10c which are held in place by machine screws or the like, as at 54.

Interposed between the arcuate segmental members 10c, and alternately arranged with respect thereto is a series of circumferentially-spaced wedge-shaped members 11c. The arcuate segmental members 10c and wedge-shaped members 11c are articulated in the same manner as shown and described in Figs. 1 to 3 inclusive.

Formed integral with the arcuate segmental members 10c and extending inwardly from the inner peripheral surface thereof is a work engaging jaw 55. The work engaging surfaces 54 are arranged 120° apart and are adapted to engage a stock at equidistant radial points. Upon expansion and contraction of the frustro-conical collet head 51, the work engaging jaw portions 55 are moved into and out of engagement with the work.

In the still further modified form of the invention shown in Figure 8, there is shown and illustrated a conventional scroll chuck 60 having radially movable work engaging jaws 61 for gripping the inner diameter of circular work pieces. The chuck 60 may be of conventional form as used upon lathes and various machine tools. A series of circumferentially-spaced arcuate sector members 10d are positioned against the face of the chuck and are connected by radially movable wedge-shaped members 11d. The arcuate segmental members 10d and wedge-shaped members 11d are constructed identical to the segmental and wedge-shaped members shown in Figures 1 to 3 inclusive, except that the wedge-shaped members 11d are provided with a pair of spaced projections 62 which are adapted to straddle the conventional work engaging jaws 61 of the scroll chuck 60. Retaining bolts 63 are passed through aligned openings in the spaced projections 62 as well as an opening in the conventional chuck jaw 61, and are held in place by nuts 64 threaded on the free ends thereof.

It will thus be seen, that radial to and fro movement of the wedge-shaped members 11d will cause a delayed or retarded radial movement of the segmental work gripping members 10d. The structure shown in Figure 8 may be employed for particular applications of the invention, and instead of the arcuate segmental members 10d being divided on their inner peripheral surfaces with work engaging jaws, thread cutting teeth may be formed thereon to adapt the invention to use as an adjustable thread cutting die member.

It is to be understood, that the forms of the invention herewith shown and described are to be taken as exemplary applications of the same, and that various changes in the shape, number of parts and size may be resorted to without departing from the spirit of the invention or the scope of the subjoined claims.

What I claim is:

1. A device of the character described, comprising an articulated annulus composed of a series of circumferentially-spaced arcuate segmental members having end walls arranged at an angle tangent to said annulus, and a series of wedge-shaped sections interposed between said arcuate segmental members and connected therewith for relative sliding movement, said arcuate segmental members and wedge-shaped members being provided with mutually engaging interlocking sliding surfaces.

2. An articulated annulus, comprising a series of segmental members arranged in circumferentially-spaced-apart relation, a series of wedge-shaped sections interposed between said segmental members, and means for maintaining the abutting surfaces of said segmental members and said wedge-shaped sections in sliding interlocked engagement.

3. An articulated annulus, comprising a series of segmental members arranged in circumferentially-spaced-apart relation, a series of wedge-shaped sections interposed between said segmental members, and mutually engaging sliding and interlocking surfaces on the ends of said segmental members and said wedge-shaped sections for retaining said segmental members and wedge-shaped sections in relative sliding abutment, each mutually engaging sliding and interlocking surface being formed to extend at an angle to the radius of the articulated annulus.

4. A machine element, comprising an articulated annulus composed of a series of circumferentially-spaced and alternately arranged segmental and wedge-shaped sections, said segmental and wedge-shaped sections being provided with mutually engaging sliding and interlocking surfaces arranged at an angle to the true radius of said annulus, and means for radially moving at least one of said series of sections to cause accelerated radial movement of the other series of said sections as a result of the sliding wedge action thereon of the other series of interlocking sections.

5. A machine element, comprising an articulated annulus composed of a series of circumferentially-spaced and alternately arranged segmental and wedge-shaped sections, said segmental and wedge-shaped sections being provided with mutually engaging sliding and interlocking surfaces arranged at an angle to the true radius of said annulus, and means for radially moving at least one of said series of sections to cause a reduced and retarded radial movement of the other of said series of sections as a result of the sliding wedge action thereon of the other series of interlocking sections.

6. A machine element, comprising an articulated annulus composed of a series of circumferentially-spaced and alternately arranged segmental and wedge-shaped sections, said segmental and wedge-shaped sections being provided with mutually engaging sliding and interlocking surfaces arranged at an angle to the true radius of said annulus, at least one of said series of sections being provided with work gripping and engaging surfaces.

HUGH E. McCALLION.

REFERENCES CITED

The following references are of record in the file of this patent:

UNITED STATES PATENTS

| Number | Name | Date |
|---|---|---|
| 624,770 | Eibee | May 9, 1899 |
| 1,013,289 | Gearhart | Jan. 2, 1912 |
| 1,305,138 | McClellon | May 27, 1919 |
| 1,494,004 | Mallory | May 13, 1924 |
| 2,329,955 | Summers | Sept. 21, 1943 |